R. E. BRUNDEGE.
REGENERATIVE BRAKE SYSTEM FOR VEHICLES.
APPLICATION FILED DEC. 9, 1911.
1,030,051.
Patented June 18, 1912.
3 SHEETS—SHEET 2.
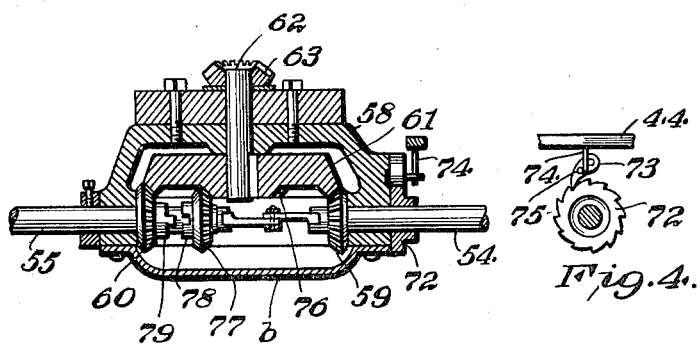
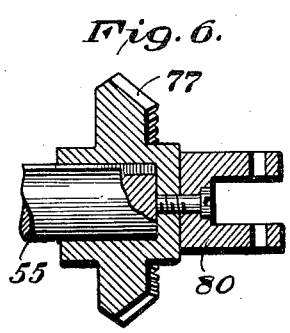
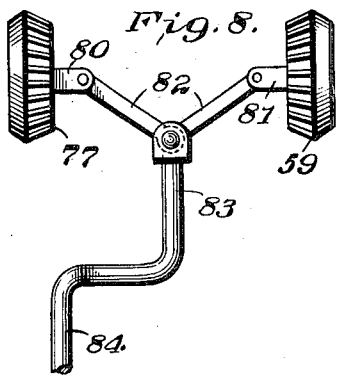
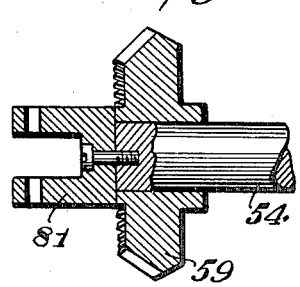
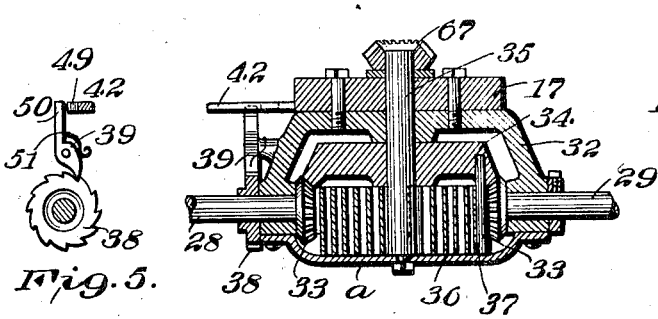
Witnesses
J. Adolph Bishop
Henry M. Hertel
Inventor
Rozier E. Brundege,
By John H. Bruninga
Attorney

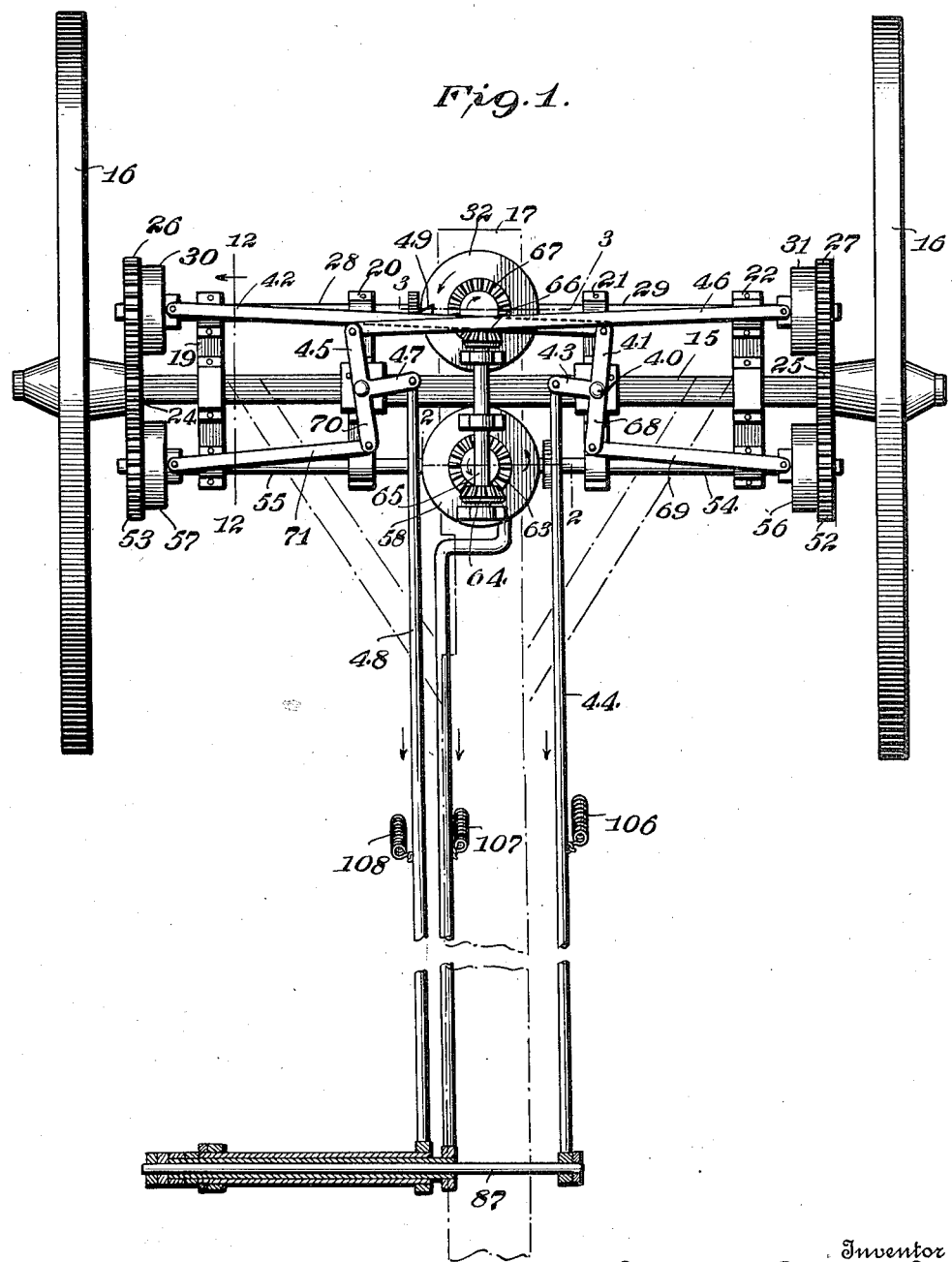

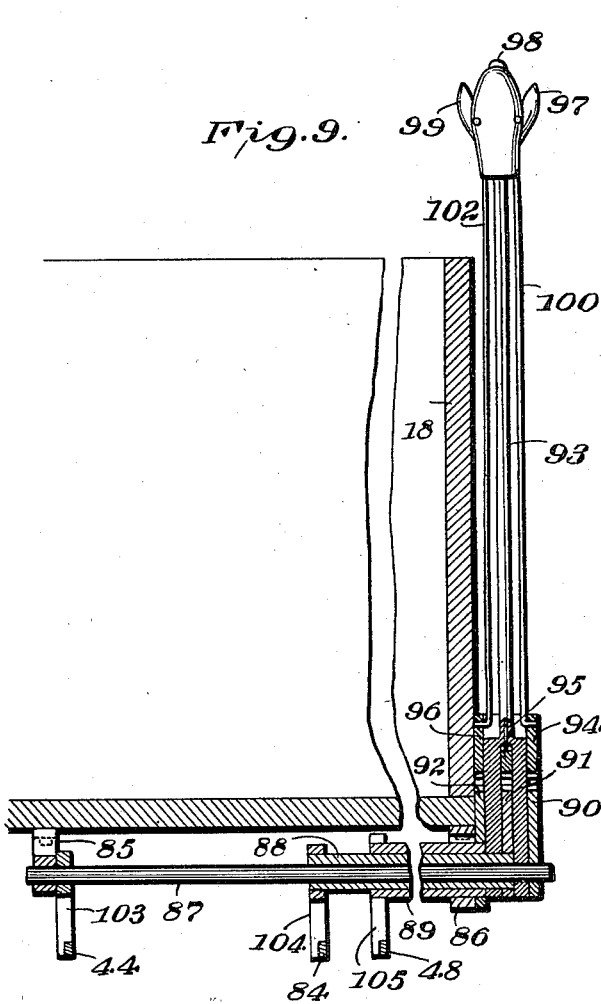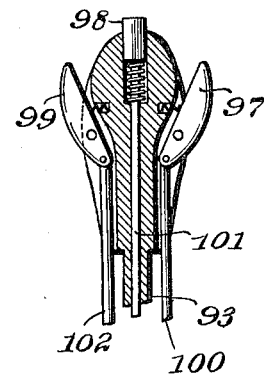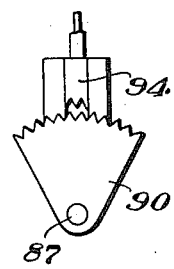

UNITED STATES PATENT OFFICE.

ROZIER E. BRUNDEGE, OF ST. LOUIS, MISSOURI.

REGENERATIVE BRAKE SYSTEM FOR VEHICLES.

1,030,051.  Specification of Letters Patent.  Patented June 18, 1912.

Application filed December 9, 1911. Serial No. 664,814.

*To all whom it may concern:*

Be it known that I, ROZIER E. BRUNDEGE, a citizen of the United States, and residing at St. Louis, in the State of Missouri, have invented certain new and useful Improvements in Regenerative Brake Systems for Vehicles, of which the following is a specification.

This invention relates to regenerative brake systems for vehicles and more particularly to road vehicles such as wagons, buggies and motor driven vehicles.

Where vehicles are used in localities where grades are encountered it is necessary to use a brake. This however results in unnecessary waste of energy, since the brake energy is dissipated in heat and therefore lost. In such localities it is also desirable to have a reserve energy supply to start or help out in places where the grade is steep.

One of the objects of this invention therefore is to construct a brake system in which the braking energy can be stored as mechanical energy to be subsequently utilized in driving the vehicle.

Another object is to construct such mechanism which will be under the control of the driver at all times, and to provide novel controlling mechanism.

Another object is to construct the mechanism so that it can be applied to vehicles of any suitable type, and even to existing vehicles without requiring the reconstruction or tearing down of such vehicles.

Further objects will appear from the detail description taken in connection with the accompanying drawings in which:

Figure 1 is a plan view showing the mechanism applied to a vehicle, Fig. 2 is a section on the line 2—2 Fig. 1, Fig. 3 is a section on the line 3—3 Fig. 1, Fig. 4 is a detail showing an end view of one of the ratchets and its pawl for preventing unwinding of the spring, Fig. 5 is a similar view showing another ratchet, Figs. 6, 7 and 8 are details of the mechanism shown in Fig. 2, Fig. 9 is a vertical section showing the controlling mechanism, Figs. 10 and 11 are details of the controlling mechanism, and Fig. 12 is a section on the line 12—12 Fig. 1, showing one of the supporting brackets.

The invention is shown as applied to an ordinary wagon having an axle 15, wheels 16, and a reach or coupling pole 17. The wagon box is shown at 18 Fig. 9.

A series of brackets 19, 20, 21 and 22 are arranged to be mounted on the axle 15 and clamped thereto by means of straps 23 as shown in Figs. 1 and 12. These brackets are provided at their ends with bearings. Gears 24 and 25 are arranged to be bolted on the hubs of the wheels, and these gears mesh with gears 26 and 27 loosely mounted upon shafts 28 and 29, which shafts are supported in the bearings on the brackets. The gears 26 and 27 are arranged to be clutched to the shafts 28 and 29 by means of clutches 30 and 31. These clutches may be of any suitable type, but preferably are friction clutches of the expanding type, since however these clutches are of well known construction it is not necessary to describe them in detatil.

Referring now to Figs. 1, 3 and 5, 32 designates a casing or bracket which is bolted to the reach and provided with a number of bearings. The shafts 28 and 29 extend into this casing and have mounted upon their ends and within the casing bevel pinions 33 which are arranged to mesh with a bevel gear 34 loosely mounted upon a shaft 35. A heavy spiral spring 36 is mounted within the casing and is connected at one end with the shaft 35 and at its other end with a pin 37 on the gear 34. The casing 32 is closed by a removable cover plate $a$ bolted thereto. The shaft 28 has rigidly secured thereto a ratchet 38 engaged by a pawl 39 pivotally mounted upon the casing 32.

The bracket 21 has pivotally mounted thereon at 40 a three-armed lever, one arm 41 of which is connected by a link 42 with the shiftable member of the clutch 30. Another arm 43 has connected thereto a link 44 which extends forwardly to the controlling lever as hereinafter described. Another three-armed lever is pivotally mounted upon the bracket 20 and has one of its arms 45 connected by a link 46 with the shiftable member of the clutch 31. Another arm 47 of said lever has a connection with a link 48 which also extends forwardly to the controlling lever. The link 42 has mounted thereon a wedge-shaped lug 49 which is adapted to engage a tail-piece 50 on the pawl 39 and throw it out of engagement with the ratchet 38 when the link 42 is shifted to throw the clutch 30 into operation. A spring 51 normally holds the pawl in engagement with the ratchet.

The mechanism so far described forms in itself a complete regenerative brake system and its operation will therefore be described. For the purpose of explaining this elemental structure we will assume the shaft 35 to be held against rotation so as to form a rigid abutment for one end of the spring 36.

When it is desired to apply the brake the operator will move the link 48 in the direction of the arrow (by means of the controlling lever hereafter described) so as to close the clutch 31 and clutch the gear 27, and therefore the right wheel 16 to the shaft 29. This will cause rotation of the gear 34 in the direction of the arrow on the casing 32 Fig. 1. Such rotation will cause the spring 36 to be wound up so that energy will be stored therein. The shaft 28 will at this time be free to revolve, since the clutch 30 is open. The pawl 39 will also ride freely over the ratchet 38, but will lock the shaft 28 and therefore the spring 36 against unwinding so that after the brake is thrown off by opening clutch 31, the spring will be locked against unwinding. Energy will thus be stored in the spring. In order to utilize the energy so stored, as when starting or going up a grade, the driver will move the link 44 in the direction of the arrow (by means of the operating lever) so as to close the clutch 30 and connect the left wheel 16 with the shaft 28 and with the spring 36. The movement of the link 42 to clutching position will cause the wedge 49 to engage the tail-piece 50 and throw the pawl 39 out of engagement with the ratchet. The mechanism is however so timed that the clutch 30 will be partially in engagement before the pawl 39 is thrown out so as to prevent sudden unwinding of the spring. The spring will be now connected to the left wheel 16, and since the shaft 28 is free to revolve the spring will drive the wheel and deliver the energy stored therein for driving said wheel. It will be noted that the driving connection between the gear 34 and the pinion 33 is such as to rotate the left wheel in a direction to drive the vehicle forwardly.

It is sometimes desirable to apply an additional brake, as when an exceptionally steep grade is encountered. This may be accomplished as follows: After the clutch 31 is thrown in to wind up the spring, the clutch 30 may also be thrown in gradually to apply an increasing braking action to the shaft 28, since an ordinary friction clutch can be thrown in gradually to operate as a friction brake especially if it is of the expanding type. By means of the controlling lever, hereafter to be described, the clutch 30 can be thrown in gradually after the clutch 31 has been closed, to gradually apply an additional brake, and this can be continued to such an extent as to slip the wheels.

With the mechanism described as above the spring will be wound by only one of the wheels to store energy in the spring, and the energy so stored will be delivered to the other wheel. It is desirable however that both wheels be working at the same time. The mechanism therefore is preferably constructed so that both wheels will wind the spring, and so that the energy is delivered and transmitted to both wheels. Such a construction will now be described. The gears 25 and 24 mesh with another pair of gears 52 and 53 loosely mounted upon shafts 54 and 55 which in turn are mounted to rotate in the brackets 19, 20, 21 and 22. Clutches 56 and 57 of the same construction as 30 and 31 are arranged to clutch the gears 52 and 53 to the shafts 54 and 55. A casing 58 similar to 32 is bolted to the reach as shown in Fig. 2 and is provided with bearings. The shafts 54 and 55 have mounted thereon and within the casing a pair of bevel pinions 59 and 60 meshing with the bevel gear 61, which in this case is keyed to a shaft 62 extending through the casing and through the reach and having keyed thereto a gear 63. The pinion 59 is keyed to the shaft 54, while the pinion 60 is loosely mounted upon the shaft 55 and is arranged to be clutched thereto by means of a clutch hereinafter described. The casing 58 is closed by a cover $b$ similar in construction as the cover $a$. The bevel gear 63 has meshing therewith a pinion 64 mounted on a horizontal shaft 65, which shaft extends across the axle 15 to the casing 32 and is supported in bearings on the casings 58 and 32 as shown in Fig. 1. The other end of the shaft 65 has keyed thereon a bevel gear 66 meshing with a gear 67 on the shaft 35. By means of this construction the gear 61 will be connected with the inside end of the spring 36 so as to wind the same from the inside. The right-hand three-armed lever operated by the link 44 has a third arm 68 connected by a link 69 with the shiftable member of the clutch 56. Similarly the left-hand three-armed lever connected with the link 48 has a third arm 70 connected by a link 71 with the shiftable member of the clutch 57. The shaft 54 has rigidly secured thereto a ratchet 72 engaged by a spring pressed pawl 73 mounted upon the casing. The link 44 is provided with a downwardly extending pin 74 adapted to engage a pin or lug 75 extending laterally from the pawl 73 as shown in Fig. 2.

The operation of the additional mechanism will be similar to the first mechanism described heretofore. In this case however the clutch 57 will act as a driving winding clutch to transmit the power from the left wheel to the spring, while the clutch 56 will be the driven clutch for transmitting the power from the spring to the right wheel. The driving or winding clutch will be operated by moving the link 48 in the direction of the arrow, while the driven or regenerating clutch 56 will be operated by moving the link 44 in the direction of the arrow. While the link 44 is operated to throw in the clutch 56, the pawl 53 will be thrown out of engagement with its ratchet, and the timing in this case is also such that the pawl will be thrown out after the clutch 56 is partially engaged. Similarly the clutch 56 may also be thrown in as a friction brake as described above.

It will be noted that both driving or winding clutches 31 and 57 are connected to be operated by the link 48, while both the driven or regenerating clutches 30 and 56 are connected to be thrown in by the link 44. It will therefore be seen that if the link 48 is moved in the direction of the arrow, both wheels will be thrown into driving engagement with the bevel gears 34 and 61 so that both will wind the spring and store energy therein. When the link 44 is moved in the direction of the arrow, the spring will be thrown into driving connection with both of the wheels 16 so that the energy stored in the spring will be transmitted to both wheels.

It is sometimes desirable to increase the rate winding of the spring, for instance where short steep places are encountered. Means are therefore provided for varying the gear ratio between the wheel and the spring. Referring to Figs. 2, 6, 7 and 8 the bevel gear 61 is shown as provided with a gear face 76 of comparatively small pitch diameter. A pinion 77 is splined on the shaft 55 and is arranged to be thrown into and out of mesh with 76. The hubs of pinions 77 and 60 are provided with jaw clutches 78 and 79 whereby the pinion 60 may be clutched and unclutched from the shaft 55 by sliding the pinion 77 on the shaft 55. A bifurcated lug 80 is pivotally mounted on the end of the pinion 77, and a second bifurcated lug 81 is pivotally mounted on the end of the shaft 54 as shown in Figs. 6 and 7. A toggle 82 has its shaft connected with a link 83 which is bent laterally so as to pass above the reach 17, the portion 84 extending forwardly to the controlling mechanism hereinafter to be described. The operation of this change speed gearing is as follows: The toggle is normally maintained in straightened position so that the clutch members 78 and 79 will be in engagement, whereby the pinion 77 will be thrown out of mesh while, the pinion 60 will be clutched to the shaft 55. In this position the spring will be wound slowly. If the link 84 is now moved in the direction of the arrow Fig. 1, the toggle 82 will be broken as shown in Fig. 8 so as to throw the pinion 77 into mesh, leaving the pinion 60 free on the shaft 55. In this position of the parts the spring will be wound at a greater rate.

The controlling mechanism will now be described. Referring to Figs. 9, 10 and 11, 85 and 86 designate a pair of brackets which are arranged to be bolted to the bottom of the wagon box and in any adjusted position thereon. Rotatively mounted in these bearings are three nested shafts 87, 88 and 89 which have rigidly mounted thereon toothed segments 90, 91 and 92. A hand lever 93 is loosely mounted upon the shafts 87 and 88 so as to embrace the segment 91. This lever has mounted thereon three blocks 94, 95 and 96 toothed to engage the segments 90, 91 and 92 respectively. The handle of the lever has pivotally mounted thereon a pair of hand pieces 97 and 99 and a button 98. These hand pieces and button are connected with the blocks 94, 95 and 96 by means of rods 100, 101 and 102. The blocks are normally maintained out of engagement with the toothed segments by means of the springs as shown in Fig. 10, but these blocks may be thrown into engagement with the segments independently or together by operating the hand pieces or the button. The shafts 87, 88 and 89 have mounted thereon arms 103, 104 and 105 which connect with the links 44, 84 and 48 respectively. Springs 106, 107 and 108, connected at one of their ends of the wagon box, at their other ends with the links 44, 84 and 48 respectively, normally move the links rearwardly, the rearward movements of these links being limited by stops on the brackets 20 and 21 and by a stop on the casing 58 (not shown).

By means of the above construction any one of the shafts may be operated independently of the others. Thus by operating the hand piece 97 the shaft 87 will be connected to the lever so that this shaft may be oscillated by moving the lever backward and forward. Similarly the shafts 88 and 89 may be oscillated by operating the button and the hand piece 99 respectively. The hand pieces and the button are also so positioned that any two or all of them may be operated together so that any two or all three shafts may be operated together. Further since the blocks may be thrown into engagement with a segment at any position of the lever, any of the shafts may be operated after another shaft has been operated through a part of its movement.

The application of the controlling mechanism to the controlled mechanism will now be described. If it is desired to brake the vehicle so as to store energy in the spring the hand piece 97 is operated so as to connect shaft 87 with the hand lever. By now moving the hand lever rearwardly or toward the driver, the link 44 is moved so as to throw in the driving or winding clutches 30 and 56 and store energy in the spring. If it is desired to increase the rate of winding the button 98 is depressed. This may be done with the thumb while the handle and the hand pieces 97 are grasped by the palm and fingers. By moving the lever backward with the button depressed and with the hand piece 97 pressed toward the handle, the spring will be wound on "high gear" or at a high rate. The button may be operated at any position of the handle to shift the gear 77 to high speed position, since the play in the clutch will be sufficient to permit such added movement of the hand lever. The winding mechanism may also be thrown on "low gear" at any position of the hand lever by merely releasing the button, since the spring 107 will move the gear 77 to low speed position and clutch gear 60 to shaft 55. The clutches may be thrown out at any time by merely releasing the hand piece 97. If during the operation of braking it is desired at any time to throw in the clutches 31 and 57 for the purpose of applying an additional friction brake, this can be done at any position of the hand lever by operating the hand piece 99 with the fingers of the hand and giving the hand lever an additional backward movement, the play in the friction clutches 31 and 57 permitting such additional movement. This additional brake can be applied gradually keeping the winding clutches closed. The driven or regenerating clutches 30 and 56 may be thrown in by operating the hand piece 99 and by then moving the hand lever backward as before.

It will thus be seen that the invention accomplishes its objects. A mechanism is provided with which it is possible to brake a vehicle and store energy for subsequent utilization in driving the vehicle. The mechanism is under absolute control of the operator, and since a single lever is used, the control will be simple and effective. The mechanism is also so constructed that it can be applied to any vehicle built or being built.

It is obvious that various changes may be made in the details of construction without departing from this invention, and it is therefore to be understood that this invention is not to be limited to the specific construction shown and described.

Having thus described the invention what is claimed is:

1. In a vehicle brake system, the combination with opposite independently rotatable vehicle wheels, of a single energy storing spring, and mechanism connecting said spring with said wheels constructed to cause both wheels to simultaneously wind said spring to store energy therein.

2. In a vehicle brake system, the combination with opposite independently rotatable vehicle wheels, of a single energy storing spring, and mechanism connecting one wheel with one end of said spring and another wheel with the other end of said spring constructed to cause both wheels to simultaneously wind said spring to store energy therein.

3. In a vehicle brake system, the combination with the opposite vehicle wheels, of a single energy storing spring, and mechanism connecting said wheels with the ends of said spring constructed to cause both said wheels to wind said spring to store energy therein, and means for applying the stored energy to both wheels.

4. In a vehicle brake system, the combination with the vehicle wheels, of an energy storing spring, mechanism connecting said spring with a pair of said wheels constructed to cause both wheels to wind up said spring to store energy therein, and means for applying the stored energy to a pair of said wheels.

5. In a vehicle brake system, the combination with the vehicle wheels, of an energy storing spring, mechanism connecting said spring with opposite wheels constructed to cause both wheels to wind up said spring and store energy therein, and means for connecting the spring to said wheels constructed to apply the energy stored in said spring for driving said wheels.

6. In a vehicle brake system, the combination with the vehicle wheels, of an energy storing spring, mechanism including a friction clutch for connecting a wheel with said spring to wind the same and store energy therein, mechanism including a second clutch for connecting said spring to another wheel to apply the stored energy for driving said wheel, said second clutch being operable as a friction brake and means for operating said clutches independently or together.

7. In a vehicle brake system, the combination with the vehicle wheels, of an energy storing spring, mechanism including a friction clutch for connecting a wheel with said spring to wind the same and store energy therein, mechanism including a second clutch for connecting said spring to another wheel to apply the stored energy for driving said wheel, and means for operating said second clutch as a friction brake.

8. In a vehicle brake system, the combination with the vehicle wheels, of an energy storing spring, mechanism including a friction clutch for connecting a wheel with said spring to wind the same and store energy therein, mechanism including a second clutch for connecting said spring to another wheel to apply the stored energy for driving said wheel, and a single lever constructed and connected to said clutches to operate them independently or together.

9. In a vehicle brake system, the combination with the vehicle wheels, of an energy storing spring, mechanism including a pair of friction clutches for connecting opposite wheels to said spring to wind the same and store energy therein, mechanism including a second pair of clutches for connecting said spring to opposite wheels to apply the stored energy to said wheels, and means for operating said clutches.

10. In a vehicle brake system, the combination with the vehicle wheels, of an energy storing spring, mechanism including a pair of friction clutches for connecting opposite wheels to said spring to wind the same and store energy therein, mechanism including a second pair of clutches for connecting said spring to opposite wheels to apply the stored energy to said wheels, and means for operating said pairs of clutches independently or together.

11. In a vehicle brake system, the combination with the vehicle wheels, of an energy storing spring, mechanism including a pair of friction clutches for connecting opposite wheels to said spring to wind the same and store energy therein, mechanism including a second pair of clutches for connecting said spring to opposite wheels to apply the stored energy to said wheels, and means for operating said second pair of clutches as friction brakes.

12. In a vehicle brake system, the combination with the vehicle wheels, of an energy storing spring, and mechanism for connecting said wheels with said spring including change speed gearing.

13. In a vehicle brake system, the combination with the vehicle wheels, of an energy storing spring, mechanism for connecting one of said wheels with said spring constructed to wind said spring and store energy therein, and means for varying the rate of winding of said spring.

14. In a vehicle brake system, the combination with the vehicle wheels, of an energy storing spring, and mechanism for connecting said wheels with said spring including a shiftable gear, and means under the control of the operator for shifting said gear to a plurality of positions.

15. In a vehicle brake system, the combination with the vehicle wheels, of an energy storing spring, a driving connection between said spring and a wheel, a clutch in said connection, means for operating said clutch, and means for varying the speed ratio between said spring and said wheel.

16. In a vehicle brake system, the combination with the vehicle wheels, of an energy storing spring, mechanism for connecting one of said wheels with said spring constructed to wind said spring and store energy therein, said mechanism including a clutch and change speed gearing, and means for operating said clutch and said change speed gearing.

17. In a vehicle brake system, the combination with the vehicle wheels, of an energy storing spring, mechanism for connecting one of said wheels with said spring constructed to wind said spring and store energy therein, said mechanism including a clutch and change speed gearing, and means for operating said clutch and said change speed gearing independently and together.

18. In a vehicle brake system, the combination with the vehicle wheels, of an energy storing spring, mechanism for connecting one of said wheels with said spring constructed to wind said spring and store energy therein, said mechanism including a clutch and change speed gearing, mechanism including a clutch for connecting said spring with one of said wheels to drive the same, and means for operating said clutches and said change speed gearing.

19. In a vehicle brake system, the combination with the vehicle wheels, of an energy storing spring, mechanism for connecting one of said wheels with said spring constructed to wind said spring and store energy therein, said mechanism including a clutch and change speed gearing, mechanism including a clutch for connecting said spring with one of said wheels to drive the same, and means for operating said clutches and said change speed gearing independently and together.

20. In a vehicle brake system, the combination with the vehicle wheels, of an energy storing spring, mechanism for connecting one of said wheels with said spring constructed to wind said spring and store energy therein, said mechanism including a clutch and change speed gearing, mechanism including a clutch for connecting said spring with one of said wheels to drive the same, and a single lever for operating said clutches and said change speed gearing.

21. In a vehicle brake system, the combination with the vehicle wheels, of an energy storing spring, a rotatable gear connected with said spring and having a plurality of gear faces, pinions meshing with said gear and constructed to be connected with said wheels to store and deliver energy from said spring, and means for controlling one of said pinions to vary the gear ratio between said gear and one of said wheels.

22. In a vehicle brake system, the combination with the vehicle wheels, of an energy storing spring, a rotatable bevel gear connected with said spring and having a plurality of gear faces of different radii, pinions connected with said gear and having driving connections with said wheels, and means for rendering said driving connections operative and inoperative.

In testimony whereof I affix my signature in presence of two witnesses.

ROZIER E. BRUNDEGE.

Witnesses:
J. H. BRUNINGA,
J. C. STERLING.

Copies of this patent may be obtained for five cents each, by addressing the "Commissioner of Patents, Washington, D. C."